(12) United States Patent
Edelstein

(10) Patent No.: US 6,675,123 B1
(45) Date of Patent: Jan. 6, 2004

(54) MAGNETIC TRACKING METHODS AND SYSTEMS

(75) Inventor: Alan S. Edelstein, Alexandria, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 10/303,923

(22) Filed: Nov. 26, 2002

(51) Int. Cl.$^7$ .............................................. G06F 15/00
(52) U.S. Cl. ...................................................... 702/150
(58) Field of Search ................................ 702/150, 152, 702/153; 324/207.11, 207.12, 207.13, 207.14

(56) References Cited

U.S. PATENT DOCUMENTS

| | | | |
|---|---|---|---|
| 5,239,474 A | 8/1993 | Eaton, Jr. et al. | 364/449 |
| 5,381,095 A | 1/1995 | Andrews | 324/326 |
| 5,684,396 A | 11/1997 | Aks et al. | 324/207.13 |
| 5,831,873 A | 11/1998 | Kohnen et al. | 364/559 |
| 6,269,324 B1 | 7/2001 | Rakijas et al. | 702/190 |
| 6,292,758 B1 | 9/2001 | Gilbert et al. | 702/150 |

Primary Examiner—Michael Nghiem
(74) Attorney, Agent, or Firm—Edward L. Stolarun

(57) ABSTRACT

Methods and systems for tracking a magnetic object are disclosed. A plurality of line segments can be complied based on data received from a plurality of magnetic sensors. The line segment that minimizes an error thereof can then be determined. The path of a magnetic object can then be established based on the compiled line segments and calculated error thereof, thereby permitting the magnetic object to be tracked according to the data received from the magnetic sensors, which can be based on the closest of approach of one or more of the magnetic sensors to the magnetic object. The present invention can thus permit a magnetic object to be tracked utilizing the total magnetic field measured at a position of closest approach by the magnetic object to one or more magnetic sensors from among a group of magnetic sensors.

20 Claims, 6 Drawing Sheets

MAGNETIC TRACKING METHODS AND SYSTEMS

STATEMENT OF GOVERNMENT INTEREST

The invention described herein may be manufactured and used by or for the United States Government for Governmental purposes without the payment of any royalties.

TECHNICAL FIELD

The present invention generally relates to magnetic sensors. The present invention also relates generally to the tracking of magnetic objects, and more particularly, to a computer-implemented algorithm that permits tracking of magnetic objects.

BACKGROUND OF THE INVENTION

Numerous opportunities exist for tracking objects that generate magnetic fields. All types of land vehicles, ships, and aircraft have structural and power systems capable of generating substantial magnetic signatures. Even small inert objects may exhibit sufficient magnetization to be observed from a distance. For example, the ability to determine the location of a metallic object on a person can be crucial. These applications include covert handgun detection to protect buildings and their occupants; pinpointing unexploded ordnance at converted military bases; and locating the position and depth of underground pipes prior to construction activities. The ability to track magnetic objects is also crucially important in other areas, such as medicine. For example, in the field of surgery, there exists a continuing need to control the orientation, forces, and/or motion of internally implanted devices. Clearly, both operation time and risk to a patient could be reduced if an apparatus and method were available to more accurately and rapidly guide or move a magnetic surgical implant.

A variety of magnetic sensor data processing algorithms, methods, systems and devices thereof capable of localizing, quantifying, and classifying objects based on their magnetic fields and magnetic signatures have been developed. To date, the prior art has been primarily concerned with detecting, locating, and classifying magnetic objects based on a large set of measurements distributed over space and/or time. Some techniques involve using measurements of an object's magnetic dipole moment. Metal objects such as firearms, automobiles, ships, submarines, and airplanes, for example, have magnetic dipole moments that can be utilized in their detection.

These techniques are based on dipole detection and localization algorithms, which assume that the field of a magnetic source object is well represented as the field of a magnetic dipole moment at distances far removed from the source. The location of the dipole is determined by maximizing an objective function over a grid of search points that spans the search volume. Two known limitations of this method are the assumption of a linear array of sensors and the need to search over all possible dipole orientations if the orientation is unknown.

Several other magnetic object tracking methods, systems and algorithms and devices thereof are also known in the art. For example, some magnetic object tracking techniques are based on electromagnetic anomaly detection technology, which senses an electromagnetic anomaly and pinpoints it at close to real time. Such a technique can measure how close a target is located to a sensor head, while locating the target or magnetic object in three dimensions and thereafter evaluating its orientation.

One of the problems associated with such prior art techniques for tracking magnetic objects is that they are generally based on the utilization of three components of a detected magnetic field. If measurements of the vector magnetic field are made, great care must be taken to minimize rotational vibrations. Because the earth's magnetic field is so large (i.e., on an order 50,000 nT), it is difficult to differentiate rotational vibrations from signals from an object.

Programs and algorithms based on such techniques require the inversion of a matrix and additionally require a great deal of processing time. Such programs and algorithms also usually require obtaining measurements from several sensors simultaneously. In order to perform several measurements on nearby weak sources and to avoid rotational vibrations, the sensors should be placed close to one another on a rigid frame. If the sensors are configured in this manner, the difference between the signals from strong distant sources is generally small. Additionally, obtaining accurate measurements of these small differences requires expensive sensors and the use of gradiometer algorithms. Such techniques are time consuming and also inefficient.

The present inventor has concluded that a need exists for improved methods and systems for tracking magnetic objects, which not only provider greater efficiency than prior art magnetic tracking techniques but can also process much more quickly and also in near real time on a fairly simple computer. Further, such sensing techniques should be able to utilize less accurate and lower cost sensors.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide methods and systems for detecting magnetic objects.

It is another aspect of the present invention to provide methods and systems for tracking magnetic objects.

It is yet another aspect of the present invention to provide improved methods and systems for detecting and tracking magnetic objects based on data collected from one or more magnetic sensors.

It is still another aspect of the present invention to provide methods and systems for tracking magnetic objects based on the total magnetic field measured at a position of closest approach to a magnetic sensor.

The above and other aspects can be achieved as will now be summarized. Methods and systems for tracking a magnetic object are disclosed herein. A plurality of line segments can be compiled based on data received from a plurality of magnetic sensors. The line segment that minimizes an error thereof can then be determined. The path of a magnetic object can then be established based on the compiled line segments and calculated error thereof, thereby permitting the magnetic object to be tracked according to the data received from the magnetic sensors, which can be based on a measurement performed at the point of closest approach of one or more magnetic sensors to the magnetic object. The aforementioned error can be calculated, wherein the variable $E_r$ represents such an error. The error $E_r$ is generally determined according to following mathematical formula:

$$E_r = \sum_i \left( \frac{S_i}{S_{imax}} - \frac{C_i}{C_{imax}} \right)^2$$

In this mathematical formulation, the variable $S_i$ represents the total magnetic field measured by the $i^{th}$ magnetic sensor among the plurality of magnetic sensors, while the variable $S_{imax}$ represents a maximum of $S_i$. The variable $C_i$ represents the total magnetic field calculated at a position of the $i^{th}$ magnetic sensor based on a set of assumptions regarding the magnetic object, which are described in greater detail herein. Finally, the variable $C_{imax}$ represents the total magnetic field calculated at a position of a magnetic sensor among a group of magnetic sensors at which the variable $S_i$ attains a maximum value.

As indicated herein, the present invention can thus permit a magnetic object to be tracked utlizing the total magnetic field measured at the position of closest approach by the magnetic object to at least one magnetic sensor from among a group of magnetic sensors. These measurements do not have to be performed simultaneously. Generally, the field measured at different sensors will be different in magnitude. Thus, less accurate, lower cost sensors can be utilized in accordance with the invention described herein.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
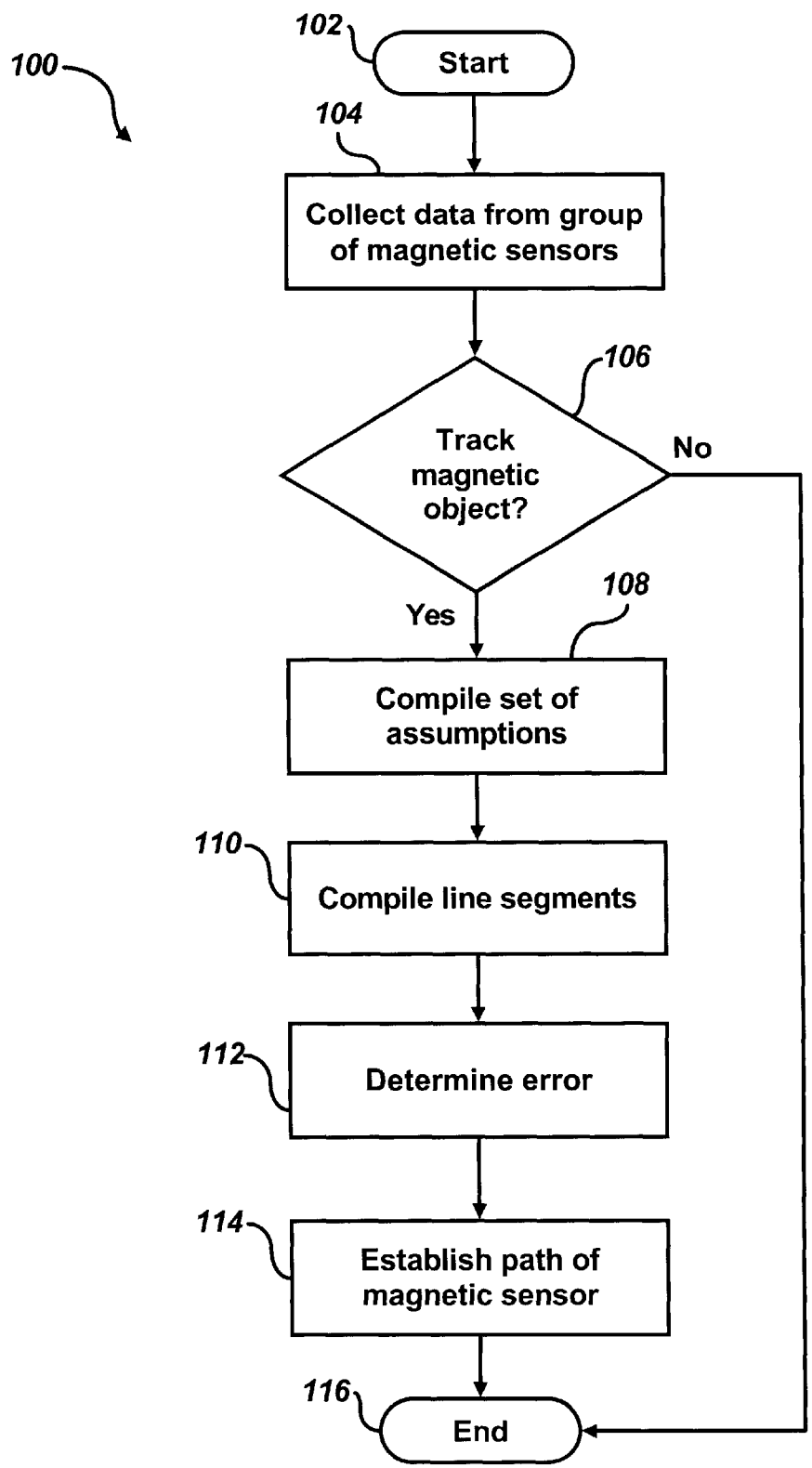
FIG. 1 illustrates a high-level flow chart of operations illustrating logical operational steps for establishing the path of a magnetic object, in, accordance with a preferred embodiment of the present invention.

FIG. 1 illustrates a high-level flow chart 100 of operations illustrating logical operational steps for establishing the path of a magnetic object, in accordance with a preferred embodiment of the present invention. Note that the term "magnetic object" as utilized herein refers not only to objects which are magnetized and which possess ferromagnetic properties, but also objects, which are non-magnetized but can nevertheless be tracked by magnetic sensors because such objects respond to the influence of a magnetic object or to the earth's magnetic field. Thus, an object such as a cast iron weapon or a metal cable located beneath the ground may comprise a "magnetic object." Similarly, objects such as land mines can comprise a "magnetic object."

As illustrated at block 102, the process is initiated. Thereafter, as indicated at block 104, data is collected or received as input from a plurality or group of magnetic sensors. Next, as illustrated at decision block 106, a determination is made whether or not to proceed with tracking or compiling the path of a magnetic object utilizing data collected from the magnetic sensors. If a decision is made not to track the magnetic object, then the process simply terminates as indicated at block 116. If, however, a decision is made to track the magnetic object, then as described at block 108, a set of assumptions can be compiled for use in tracking the magnetic object. These assumptions are explained in greater detail with respect to FIG. 2.

As described next at block 110, one or more line segments are generally computed using the algorithm based on data collected from the magnetic sensors. The process described herein, including algorithms thereof, essentially considers different straight-line segments to find line segments that minimize an error, $E_r$, as indicated at block 112. This error value is described in greater detail herein with respect to FIG. 3. Thereafter, the path of the magnetic object can be established or tracked based on data collected from the magnetic sensors. This data includes the total magnetic field measured at the position of closest approach to one or more of the magnetic sensors.

Figure 2:
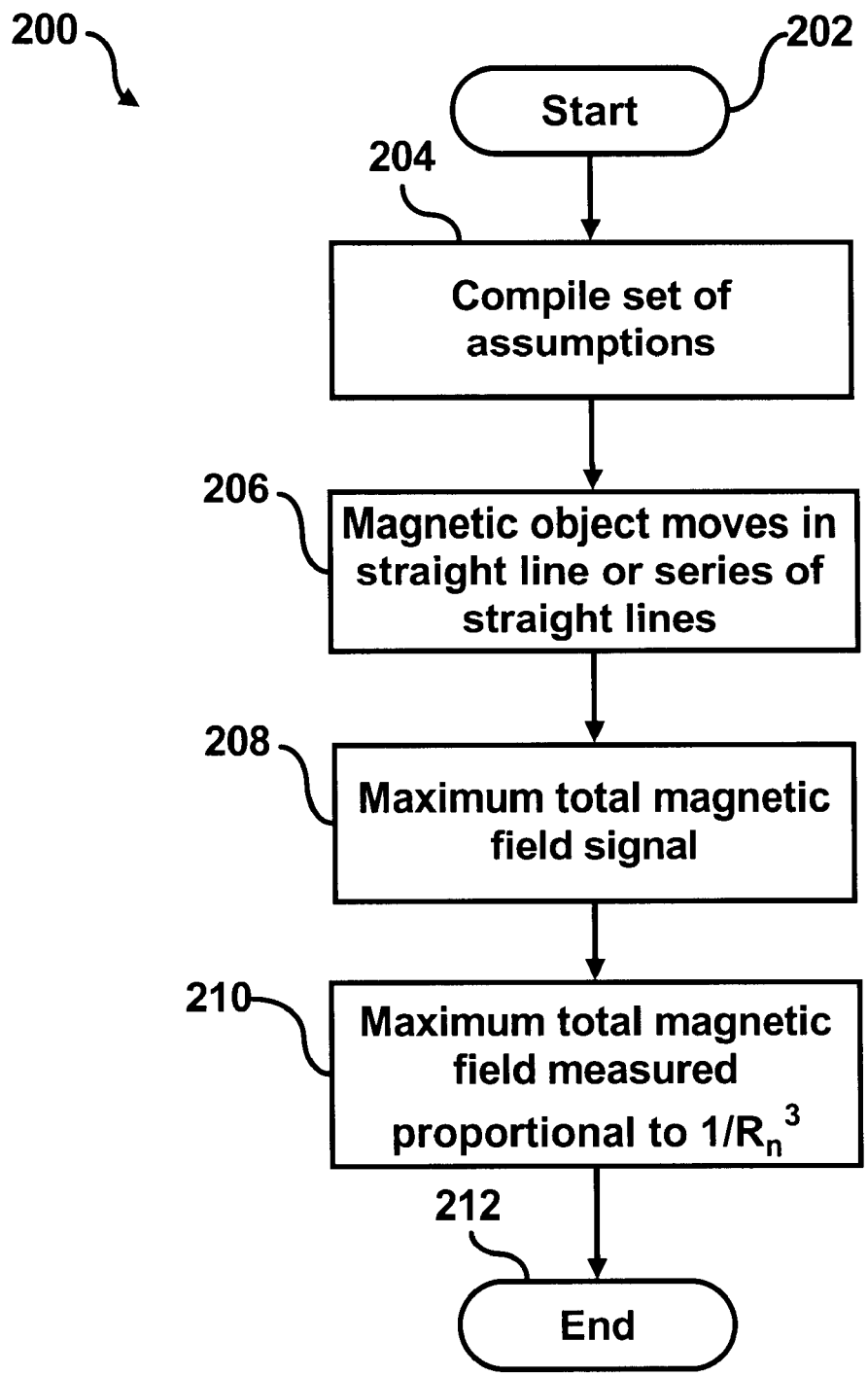
FIG. 2 depicts a high-level flow chart of operations illustrating logical operational steps for implementing a set of assumptions for tracking a magnetic object, in accordance with a preferred embodiment of the present invention.

FIG. 2 depicts a high-level flow chart 200 of operations illustrating logical operational steps for implementing a set of assumptions for tracking a magnetic object, in accordance with a preferred embodiment of the present invention. Methods and systems for tracking a magnetic object based on the total magnetic field measured at the position of closest approach by the magnetic object to one or more of the magnetic sensors can be based on a set of compiled assumptions. As indicated at block 202, a general method for implementing such assumptions is initiated. As indicated at block 204, an order is processed to compile these assumptions. Need to discuss the previous sentence The first assumption is illustrated at block 206, which assumes that the magnetic object to be tracked moves in a straight-line path or a series of straight-line paths. Thereafter, as indicated at block 206, a second assumption assumes that the maximum total magnetic field signal comes from the point of closest approach along the path. This assumption is satisfied for two orientations of the objects magnetic moment. In other cases, even though it is not satisfied, it only leads in the worse case to 2.5% parallel displacement of the computed line segment from the actual line segment. The third assumption is depicted at block 210, which assumes that the maximum total magnetic field measured by one or more of the magnetic sensors is proportional to $1/R_i^3$ where the variable $1/R_i$ represents the distance between the $i_{th}$ magnetic sensor and the magnetic object at the position of closest approach to the magnetic sensor.

Figure 3:
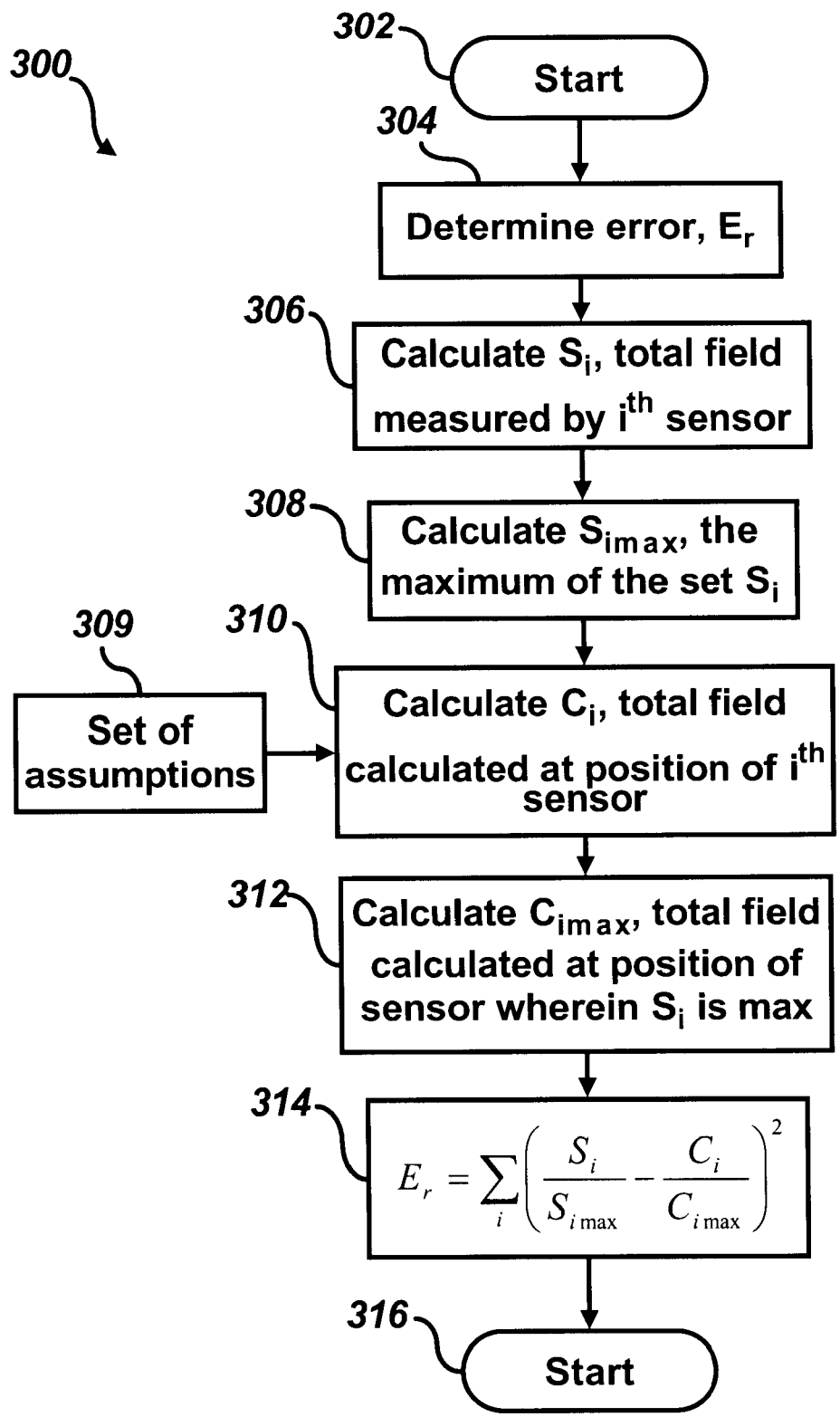
FIG. 3 illustrates a high-level flow chart of operations illustrating logical operation steps for determining an error, in accordance with a preferred embodiment of the present invention.

FIG. 3 illustrates a high-level flow chart 300 of operations illustrating logical operational steps for determining an error, in accordance with a preferred embodiment of the present invention. The process illustrated in FIG. 3 generally represents the operation depicted at block 112 of FIG. 1. As illustrated at block 302, the process begins. As indicated next at block 304, instructions are initiated to calculate the error $E_r$. As depicted thereafter at block 306, the variable $S_i$ is calculated, wherein $S_i$ comprises the total magnetic field measured by the $i_{th}$ magnetic sensor among the plurality of magnetic sensors utilized to compile magnetic field data concerning a magnetic object to be tracked.

Next, as described at block 308, the variable $S_{imax}$ can be calculated, wherein $S_{imax}$ a represents the maximum of the set $S_i$. Next, as illustrated at block 310, a variable $C_i$ is calculated which represents comprises the total magnetic field calculated at the position of the $i^{th}$ magnetic sensor, utilizing the assumptions compiled, as illustrated in FIG. 2 and at block 309 of FIG. 3. Thereafter, as depicted at block 312, a variable $C_{imax}$ can be calculated, which represents the total magnetic field calculated at the position of the magnetic sensor(s) at which $S_i$ is maximum. Finally, as illustrated at block 314, the error $E_r$ can be calculated based on the mathematical formulation described in equation (1) below:

$$E_r = \sum_i \left( \frac{S_i}{S_{imax}} - \frac{C_i}{C_{imax}} \right)^2 \quad (1)$$

The process then terminates, as illustrated next at block 316. The methodology described herein generally requires input from at least two, but preferably three or more magnetic sensors. Those skilled in the art, however, can appreciate that variations to this number may be implemented. For example, a magnetic object can be detected and tracked utilizing seven magnetic sensors. If the path of the magnetic object is not a straight-line and the magnetic object is detected utilizing seven magnetic sensors, a plurality of line segments can be calculated based on the use of varying subgroups of magnetic sensors. This example is illustrated in FIG. 4 herein.

Figure 4:
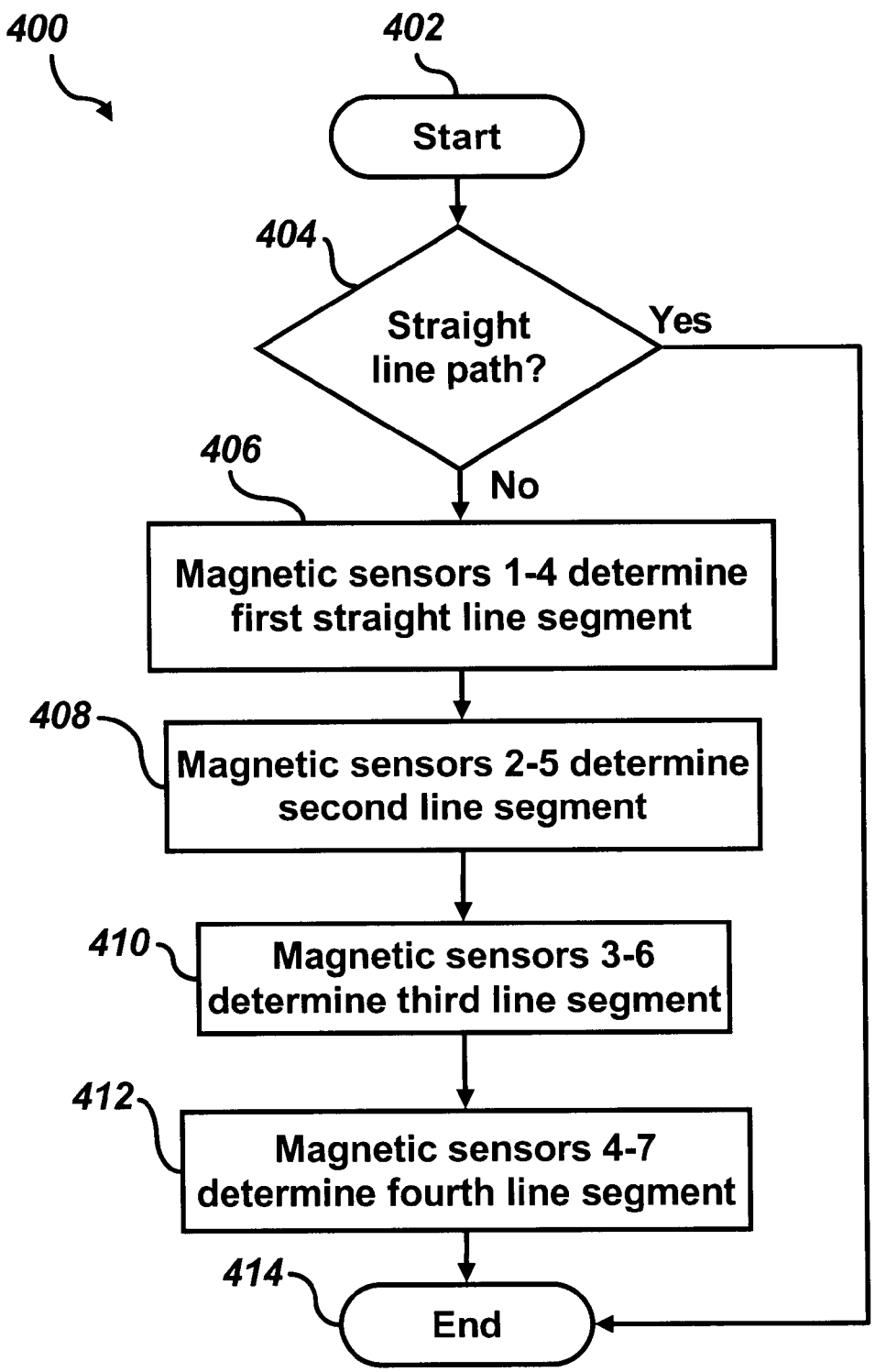
FIG. 4 depicts a high-level flow chart of operations illustrating logical operations for determining a plurality of line segments, in accordance with an alternative embodiment of the present invention.

FIG. 4 depicts a high-level flow chart 400 of operations illustrating logical operations for determining a plurality of line segments, in accordance with an alternative embodiment of the present invention. As indicated at block 402, the process is initiated. Next, as depicted at block 404, a determination is made whether or not the path comprises a straight line. If the path is a straight line, then the process simply terminates as depicted at block 414. If, the path is not a straight line, then the process continues as described as block 406, wherein magnetic sensors 1–4 are utilized to determine the first straight line segment. Next, as depicted at block 408, magnetic sensors 2–5 can be utilized to determine the second line segment. Thereafter, as described at block 410, magnetic sensors 3–6 are utilized to determine the third line segment. Next, as indicated at block 412, magnetic sensors 4–7 can be utilized to determine the fourth line segment. Finally, the process terminates, as depicted at block 414.

Figure 5:
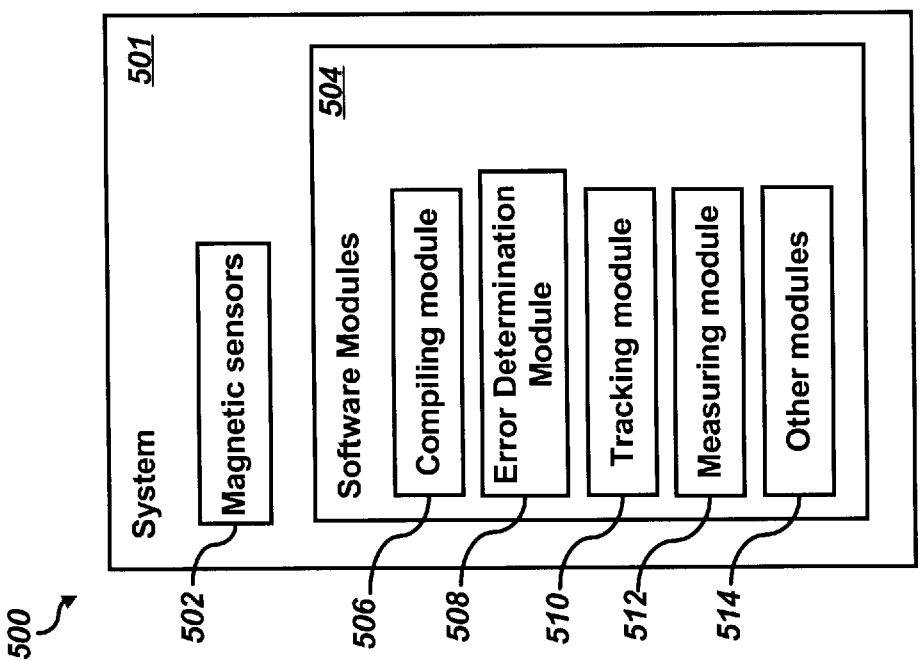
FIG. 5 illustrates a high-level block diagram illustrating a system for tracking a magnetic object, which can be implemented in accordance with a preferred embodiment of the present invention.

FIG. 5 illustrates a high-level block diagram 500 illustrating a system 501 for tracking a magnetic object, which can be implemented in accordance with a preferred embodiment of the present invention. It can be appreciated by those skilled in the art that the present invention may be implemented as a program product (i.e., computer program product) composed of one or more modules. The term "module" as utilized herein thus generally refers to a software module. In the computer programming arts, a module can be implemented as a collection of routines and data structures that performs particular tasks or implements a particular abstract data type.

Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based. Thus, when referring to a "module" herein, the present inventors are referring so such software modules or implementations thereof. The terms "module" and "software module" can be utilized interchangeably with one another to describe the same element or feature.

The methods and systems described herein can be implemented as a series of modules either functioning alone or in concert with physical electronic and computer hardware devices. Such modules can be utilized separately and/or together locally and/or remotely to form a program product thereof that can be implemented through signal-bearing media, including transmission media and recordable media. The present invention can be implemented as a program product composed of a plurality of such modules, which can be interactively displayed for a user on a display screen of a data-processing system (e.g., computer). Such interactivity may be provided by a graphical user interface (GUI), which is well known in the art, including Internet browser applications thereof.

At a basic level, system 501 comprises a plurality of magnetic sensors 502, which interacts with one or more software modules 504, including a compiling module 506 for compiling a plurality of line segments based on data received from the plurality of magnetic sensors, an error determination module 508 for determining which line segment among the plurality of line segments minimizes the error $E_r$ thereof, and a tracking module 510 for establishing a path of a magnetic object based on the plurality of line segments and the error $E_r$ thereof, thereby permitting the magnetic object to be tracked according to the data received from the plurality of magnetic sensors based on a closest of approach of one or more magnetic sensors from among a plurality of magnetic sensors to the magnetic object. Recall that error $E_r$ can be calculated according to equation (1) described earlier.

Additionally, software modules 504 can include a measuring module 512 for measuring a maximum total magnetic field of the magnetic object based on data received by the plurality of magnetic sensors, wherein the maximum total field is proportional to $1/R_i^3$, and wherein $R_i$ comprises a variable representing the distance between the $i^{th}$ magnetic sensor among the plurality of the magnetic sensors at a position of closest approach between one or more magnetic sensors and the magnetic object. Finally, software modules 504 can include other modules 514, which can assist in tracking the magnetic object.

Figure 6:
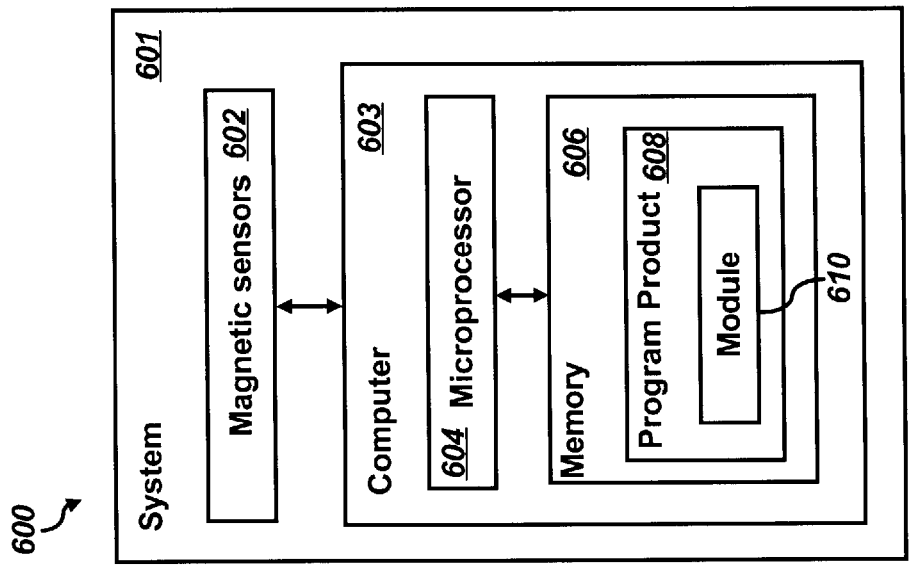
FIG. 6 depicts a high-level block diagram illustrating a system for tracking a magnetic object, which can be implemented in accordance with an alternative embodiment of the present invention.

FIG. 6 illustrates a high-level block diagram 600 illustrating a system 601 for tracking a magnetic object, which can be implemented in accordance with an alternative embodiment of the present invention. System 601 can be configured as a single unit and can include a plurality of magnetic sensors 602 that communicate with a computer 603, which may be integrated with or house separately from such a unit. Computer 603 comprises a data-processing system in which the present invention may be implemented.

Figure 7:
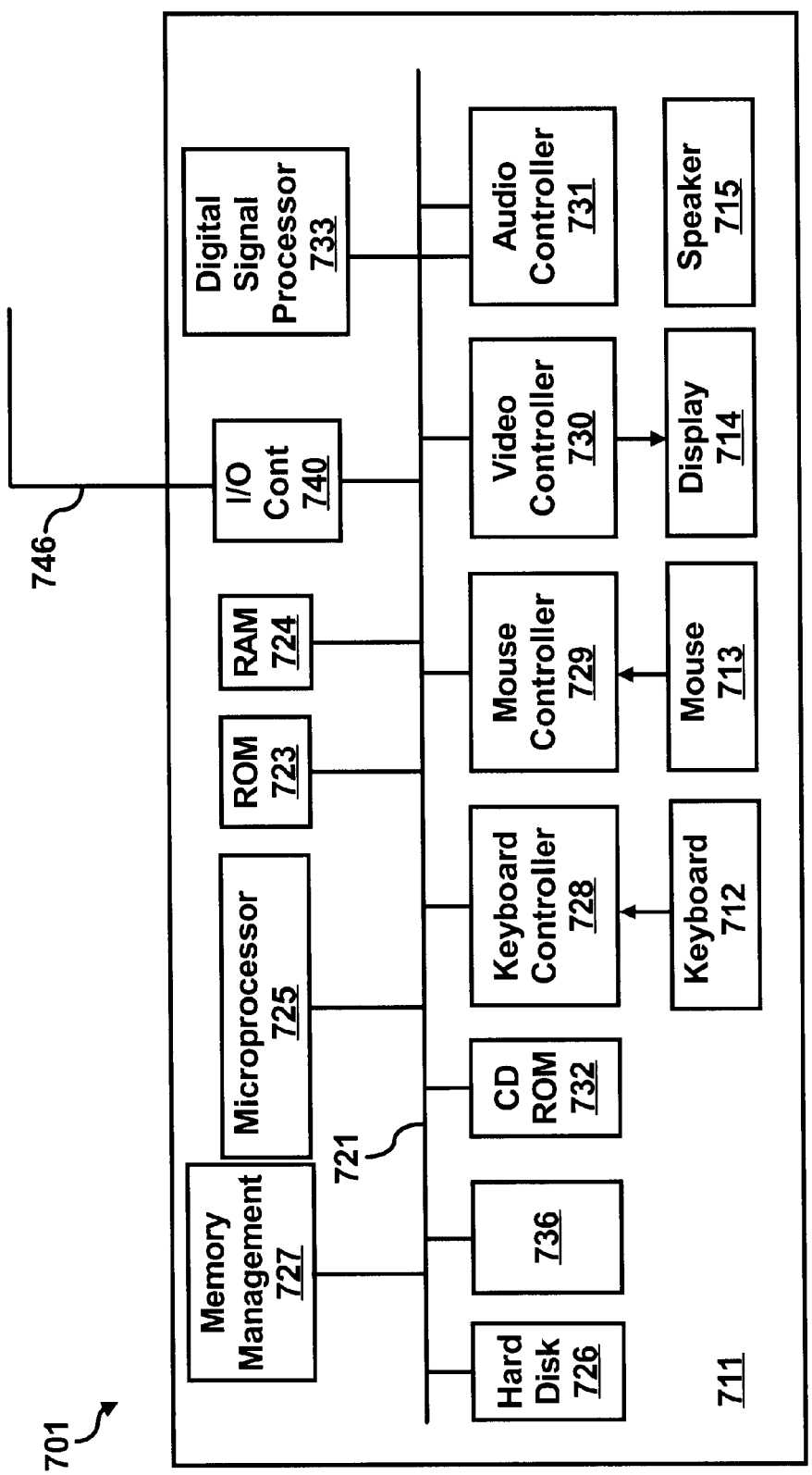
FIG. 7 illustrates a block diagram of a computer in which the present invention be implemented.

A detailed description of the internal components of a data processing system such as computer 603 is described in greater detail herein with respect to FIG. 7. In general, however, computer 603 includes a microprocessor 604 and a memory unit 606. As discussed herein, a "computer" is generally considered a product including circuitry capable of processing data. The computer system may include, but is not limited to, general-purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like.

Microprocessor 604 thus communicates with memory unit 606 in which a program product 608 can be stored. Program product 608 generally can be configured to include one or more modules 610 for performing specific instructions. Program product 608 generally comprises a computer program product comprising a computer readable storage medium and a computer program embedded therein in order to implement instructions provided by module 610. Recall that a module can be implemented as a single module or a plurality of module. For example, module 610 is generally analogous to software modules 504 of FIG. 5 and can include compiling module 506, error determination module 508, tracking module 510, measuring module 512 and so forth.

Those skilled in the art can thus appreciate that the present invention may be run on a variety of computers or collection of computers under a number of different operating systems. The computer could be, for example, a personal computer, a mini computer, mainframe computer or a computer running in a distributed network of other computers. In FIG. 7, a computer 701 comprises a system unit 711, a keyboard 712, a mouse 713 and a display 714, which are depicted in block diagram form.

The system unit 711 includes a system bus or plurality of system buses 721 to which various components can be coupled and by which communication between the various components is accomplished. The microprocessor 725 is connected to the system bus 721 and is supported by read only memory (ROM) 723 and random access memory (RAM) 724 also connected to system bus 721. Note that microprocessor 725 of FIG. 7 is generally analogous to microprocessor 604 of FIG. 6. Similarly, computer 701 of FIG. 7 is also analogous to computer 603 of FIG. 6. Computer 701 may thus communicate with magnetic sensors 602 to provide capabilities for tracking magnetic objects, as indicated herein.

Microprocessor 725 can be implemented as a microprocessor in the IBM PC series of computers or one of the Intel families of microprocessors including the 386, 486 or Pentium microprocessors and improvements thereof. Other microprocessors, however, including, but not limited to, Motorola's family of microprocessors such as the 68000, 68020 or the 68030 microprocessors and various Reduced Instruction Set Computers (RISC) microprocessors such as the Power PC chip manufactured by IBM can be utilized. Other RISC chips made by Hewlett Packard, Sun, Motorola and others can also be utilized in an implementation of computer 701.

ROM 723 contains among other code the Basic Input-Output system (BIOS), which controls basic hardware operations such as the interaction of the processor and the disk drives and the keyboard. The RAM 724 is the main memory into which the operating system and application programs are loaded. Note that the memory management chip 727 may actually function as a microprocessor, and thus microprocessor 725 can be used in place of or in association with memory management chip 727. Both memory management chip 727 and microprocessor 725 can be connected to the system bus 721 to control direct memory access operations including, passing data between the RAM 724 and hard disk drive 726 and floppy disk drive 727. The CD ROM 732 is also coupled to the system bus 721 can be used to store a large amount of data (e.g., a multimedia program or presentation).

Also connected to this system bus 721 are various I/O controllers: The keyboard controller 728, the mouse controller 729, the video controller 730, and the audio controller 731. As might be expected, the keyboard controller 28 provides the hardware interface for the keyboard 712, the mouse controller 729 provides the hardware interface for mouse 713, the video controller 730 is the hardware interface for the display 714, and the audio controller 731 is the hardware interface for the speakers 715. An I/O controller 740 such as a Token Ring Adapter enables communication over a network 746 to other similarly configured data processing systems.

The present invention may be implemented as sets of instructions resident in the random access memory 724 of one or more computer systems configured generally as described above. For example, the operations illustrated in FIGS. 1 to 4 may be implemented as sets of instructions resident in random access memory 724. Alternatively, modules and program products thereof, such as module 610 and program product 508 may be stored in random access memory 724. Until required by the computer system, such sets of instructions, including modules and program product implementations thereof, can also be stored in another computer readable memory, for example, in the hard disk drive 726, or in a removable memory such as an optical disk for eventual use in the CD-ROM 732 or in a floppy disk for eventual use in the floppy disk drive 736.

Further, such sets of instructions and modules and program products thereof can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein, which form part of the present invention; the operations are machine operations processing electrical signals to generate other electrical signals.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for tracking a magnetic object, said method comprising the steps of:
   compiling a plurality of line segments based on data received from a plurality of magnetic sensors;
   determining which line segment among said plurality of line segments minimizes an error thereof; and
   establishing a path of a magnetic object based on said plurality of line segments and said error thereof, thereby permitting said magnetic object to be tracked according to said data received from said plurality of magnetic sensors based on a position of closest of approach of at least two magnetic sensors from among said plurality of magnetic sensors to said magnetic object.

2. The method of claim 1 further comprising the step of calculating said error, wherein said error is represented by a variable $E_r$, which is defined by a mathematical formula comprising:

$$E_r = \sum_i \left( \frac{S_i}{S_{imax}} - \frac{C_i}{C_{imax}} \right)^2$$

wherein $S_i$ comprises a variable representing a total magnetic field measured by an $i^{th}$ magnetic sensor among said plurality of magnetic sensors;
   wherein $S_{imax}$ comprises a variable representing a maximum of $S_i$,
   wherein $C_i$ comprises a variable representing a total magnetic field calculated at a position of said $i^{th}$ magnetic sensor based on a set of assumptions regarding said magnetic object; and
   wherein $C_{imax}$ comprises a variable representing a total magnetic field calculated at a position of a magnetic sensor among said plurality of magnetic sensors at which $S_i$ is maximum.

3. The method of claim 1 further comprising the step of:
   configuring said plurality of magnetic sensors to comprise at least two magnetic sensors.

4. The method of claim 1 wherein the step of compiling a plurality of line segments based on data received from a plurality of magnetic sensors, further comprises the step of:
   compiling said plurality of line segments based on an assumption that each line segment among said plurality of line segments comprises a straight-line segment.

5. The method of claim 1 wherein the step of compiling a plurality of line segments based on data received from a plurality of magnetic sensors, further comprises the step of:
   compiling said plurality of line segments based on an assumption that said magnetic object moves in a straight-line path.

6. The method of claim 1 wherein the step of compiling a plurality of line segments based on data received from a plurality of magnetic sensors, further comprises the step of:
   compiling a plurality of line segments based on an assumption that magnetic object moves in a series of straight-line paths.

7. The method of claim 1 further comprising the step of:
   measuring a maximum total magnetic field of said magnetic object based on data received by said plurality of magnetic sensors, wherein said maximum total field is proportional to $1/R_i^3$, wherein $R_i$ comprises a variable representing a distance between an $i_{th}$ magnetic sensor among said plurality of said magnetic sensors at a position of closest approach between said $i_{th}$ sensor magnetic sensor and said magnetic object.

8. The method of claim 1 further comprising the steps of:
   detecting said magnetic object utilizing said plurality of magnetic sensors, wherein said plurality of magnetic sensors comprises first, second, third, fourth, fifth, sixth and seventh magnetic sensors thereof;
   compiling a first line segment of said plurality of line segments utilizing said first through fourth magnetic sensors thereof;
   compiling a second line segment of said plurality of line segments utilizing said second through fifth magnetic sensors thereof;
   compiling a third line segment of said plurality of line segments utilizing said third through sixth magnetic sensors thereof; and
   compiling a fourth line segment utilizing said fourth through seventh magnetic sensors thereof.

9. The method of claim 8 further comprising the step of:
   numbering said plurality of sensors according to a time of detection represented by a variable $t_i$.

10. A method for tracking a magnetic object, said method comprising the steps of:
    compiling a plurality of line segments based on data received from a plurality of magnetic sensors;
    determining which line segment among said plurality of line segments minimizes an error thereof;
    establishing a path of a magnetic object based on said plurality of line segments and said error thereof, thereby permitting said magnetic object to be tracked according to said data received from said plurality of magnetic sensors based on a closest of approach of at least one magnetic sensor from among said plurality of magnetic sensors to said magnetic object;
    calculating said error by the variable $E_r$, wherein said error is defined by a mathematical formula comprising:

$$E_r = \sum_i \left( \frac{S_i}{S_{imax}} - \frac{C_i}{C_{imax}} \right)^2$$

wherein $S_i$ comprises a variable representing a total magnetic field measured by an $i^{th}$ magnetic sensor among said plurality of magnetic sensors;
    wherein $S_{imax}$ comprises a variable representing a maximum of $S_i$;
    wherein $C_i$ comprises a variable representing a total magnetic field calculated at a position of said $i^{th}$ magnetic sensor based on a set of assumptions regarding said magnetic object; and
    wherein $C_{imax}$ comprises a variable representing a total magnetic field calculated at a position of a magnetic sensor among said plurality of magnetic sensors at which $S_i$ is maximum.

11. A system for tracking a magnetic object, said system comprising:

a plurality of magnetic sensors;

compiling module for compiling a plurality of line segments based on data received from said plurality of magnetic sensors;

error determination module for determining which line segment among said plurality of line segments minimizes an error thereof; and tracking module for establishing a path of a magnetic object based on said plurality of line segments and said error thereof, thereby permitting said magnetic object to be tracked according to said data received from said plurality of magnetic sensors based on a position of closest of approach of at least two magnetic sensors from among said plurality of magnetic sensors to said magnetic object.

12. The system of claim 11 wherein said error determination module further comprises:

calculating module for calculating said error, wherein said error is represented by a variable $E_r$, which is defined by a mathematical formula as follows:

$$E_r = \sum_i \left( \frac{S_i}{S_{imax}} - \frac{C_i}{C_{imax}} \right)^2$$

wherein $S_i$ comprises a variable representing a total magnetic field measured by an $i^{th}$ magnetic sensor among said plurality of magnetic sensors;

wherein $S_{imax}$ comprises a variable representing a maximum of $S_i$;

wherein $C_i$ comprises a variable representing a total magnetic field calculated at a position of said $i^{th}$ magnetic sensor based on a set of assumptions regarding said magnetic object; and wherein $C_{imax}$ comprises a variable representing a total magnetic field calculated at a position of a magnetic sensor among said plurality of magnetic sensors at which $S_i$ is maximum.

13. The system of claim 11 wherein said plurality of magnetic sensors comprises at least three magnetic sensors.

14. The system of claim 11 wherein plurality of line segments are compiled based on an assumption that each line segment among said plurality of line segments comprises a straight-line segment.

15. The system of claim 11 wherein said plurality of line segments are complied based on an assumption that said magnetic object moves in a straight-line path.

16. The system of claim 11 wherein said plurality of line segments are compiled based on an assumption that magnetic object moves in a series of straight-line paths.

17. The system of claim 11 further comprising:

measuring module for measuring a maximum total magnetic field of said magnetic object based on data received by said plurality of magnetic sensors, wherein said maximum total field is proportional to $1/R_i^3$, wherein $R_i$ comprises a variable representing a distance between at least one magnetic sensor among said plurality of said magnetic sensors at a position of closest approach between said at least one magnetic sensor and said magnetic object.

18. The system of claim 11 further comprising:

detecting module for detecting said magnetic object utilizing said plurality of magnetic sensors, wherein said plurality of magnetic sensors comprises first, second, third, fourth, fifth, sixth and seventh magnetic sensors thereof;

compiling module for compiling a first line segment of said plurality of line segments utilizing said first through fourth magnetic sensors thereof, a second line segment of said plurality of line segments utilizing said second through fifth magnetic sensors thereof, a third line segment of said plurality of line segments utilizing said third through sixth magnetic sensors thereof, and a fourth line segment utilizing said fourth through seventh magnetic sensors thereof.

19. The system of claim 18 wherein said plurality of sensors are numbered according to a time of detection represented by a variable $t_i$.

20. A system for tracking a magnetic object, said system comprising:

compiling module for compiling a plurality of line segments based on data received from a plurality of magnetic sensors;

error determination module for determining which line segment among said plurality of line segments minimizes an error thereof;

tracking module for establishing a path of a magnetic object based on said plurality of line segments and said error thereof, thereby permitting said magnetic object to be tracked according to said data received from said plurality of magnetic sensors based on a closest of approach of at least one magnetic sensor from among said plurality of magnetic sensors to said magnetic object;

wherein said error determination module further comprises a calculating module for calculating said error by the variable $E_r$, wherein said error is defined by a mathematical formula comprising:

$$E_r = \sum_i \left( \frac{S_i}{S_{imax}} - \frac{C_i}{C_{imax}} \right)^2$$

wherein $S_i$ comprises a variable representing a total magnetic field measured by an $i^{th}$ magnetic sensor among said plurality of magnetic sensors;

wherein $S_{imax}$ comprises a variable representing a maximum of $S_i$;

wherein $C_i$ comprises a variable representing a total magnetic field calculated at a position of said $i^{th}$ magnetic sensor based on a set of assumptions regarding said magnetic object; and wherein $C_{imax}$ comprises a variable representing a total magnetic field calculated at a position of a magnetic sensor among said plurality of magnetic sensors at which $S_i$ is maximum.

* * * * *